United States Patent
Keller (10) Patent No.: US 8,603,615 B2
(45) Date of Patent: Dec. 10, 2013

(54) SECURITY ELEMENT (75) Inventor: Mario Keller, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 144 days.

(21) Appl. No.: 12/669,838

(22) PCT Filed: Jul. 10, 2008

(86) PCT No.: PCT/EP2008/005624
§ 371 (c)(1),
(2), (4) Date: Jan. 20, 2010

(87) PCT Pub. No.: WO2009/012893
PCT Pub. Date: Jan. 29, 2009

(65) Prior Publication Data
US 2010/0196587 A1 Aug. 5, 2010

(30) Foreign Application Priority Data
Jul. 23, 2007 (DE) .......................... 10 2007 034 716

(51) Int. Cl.
*B32B 7/00* (2006.01)
*B32B 15/00* (2006.01)
*B44C 1/00* (2006.01)
*B42D 15/00* (2006.01)
*B42D 15/10* (2006.01)

(52) U.S. Cl.
USPC .......... 428/209; 428/195.1; 428/916; 283/72; 283/94

(58) Field of Classification Search
USPC .............................. 428/29; 283/72, 85, 67, 94
See application file for complete search history.

(56) References Cited

U.S. PATENT DOCUMENTS

| 7,085,058 B2* | 8/2006 | Heim ............................ 359/582 |
| 7,667,894 B2 | 2/2010 | Hoffmuller |
| 7,728,931 B2 | 6/2010 | Hoffmuller |
| 7,744,129 B2 | 6/2010 | Heim |
| 7,808,605 B2* | 10/2010 | Hoffmuller et al. .......... 349/187 |
| 7,986,459 B2 | 7/2011 | Kaule |
| 2005/0127663 A1* | 6/2005 | Heim .............................. 283/72 |
| 2007/0165182 A1 | 7/2007 | Hoffmuller |
| 2007/0211238 A1 | 9/2007 | Hoffmuller |
| 2007/0216518 A1 | 9/2007 | Hoffmuller |
| 2007/0229928 A1 | 10/2007 | Hoffmuller |
| 2007/0241553 A1 | 10/2007 | Heim |

(Continued)

FOREIGN PATENT DOCUMENTS

DE 10319232 A1 11/2004
DE 10 2004 039355 A1 2/2006

(Continued)

OTHER PUBLICATIONS

International Search Report, International Application No. PCT/EP2008/005624, 3 pages, Nov. 16, 2008.

(Continued)

*Primary Examiner* — Mark Ruthkosky
*Assistant Examiner* — Laura C Powers
(74) *Attorney, Agent, or Firm* — Lathrop & Gage LLP (57) ABSTRACT

The present invention relates to a multilayer security element having a first, transparent layer structure having first, translucent sub-regions and a second, opaque layer structure exhibiting a color-shift effect and having second, transparent sub-regions.

23 Claims, 4 Drawing Sheets

(56) References Cited

U.S. PATENT DOCUMENTS

| | | |
|---|---|---|
| 2007/0246933 A1 | 10/2007 | Heim |
| 2007/0274559 A1 | 11/2007 | Depta |
| 2008/0014378 A1 | 1/2008 | Hoffmuller |
| 2008/0054621 A1 * | 3/2008 | Burchard et al. ............... 283/72 |
| 2008/0079257 A1 | 4/2008 | Fessl |
| 2008/0088859 A1 | 4/2008 | Depta |
| 2008/0160226 A1 | 7/2008 | Kaule |
| 2008/0163994 A1 | 7/2008 | Hoppe |
| 2008/0198468 A1 | 8/2008 | Kaule |
| 2008/0216976 A1 | 9/2008 | Ruck |
| 2008/0250954 A1 | 10/2008 | Depta |
| 2008/0258456 A1 | 10/2008 | Rahm |
| 2009/0001709 A1 | 1/2009 | Kretschmar |
| 2009/0008923 A1 | 1/2009 | Kaule |
| 2009/0008926 A1 | 1/2009 | Depta |
| 2009/0102605 A1 | 4/2009 | Kaule |
| 2009/0115185 A1 | 5/2009 | Hoffmuller |
| 2009/0236061 A1 | 9/2009 | Gruszczynski |
| 2009/0297805 A1 | 12/2009 | Dichtl |
| 2009/0322071 A1 | 12/2009 | Dichtl |
| 2010/0175843 A1 | 7/2010 | Gregarek |
| 2010/0177094 A1 | 7/2010 | Kaule |
| 2010/0182221 A1 | 7/2010 | Kaule |
| 2010/0194091 A1 | 8/2010 | Heim |
| 2010/0194532 A1 | 8/2010 | Kaule |
| 2010/0207376 A1 | 8/2010 | Heim |
| 2010/0208036 A1 | 8/2010 | Kaule |

FOREIGN PATENT DOCUMENTS

| | | |
|---|---|---|
| EP | 0395410 B1 | 8/1997 |
| EP | 1023499 B1 | 5/2004 |
| EP | 1748306 A1 | 1/2007 |
| WO | WO 95/10420 | 4/1995 |
| WO | WO 01/03945 A1 | 1/2001 |
| WO | WO 03/061980 A1 | 7/2003 |
| WO | WO 03059644 A1 * | 7/2003 |
| WO | WO 2005/105475 A1 | 11/2005 |
| WO | WO 2005105473 | 11/2005 |
| WO | WO 2005105474 | 11/2005 |
| WO | WO 2005105475 | 11/2005 |
| WO | WO 2005105475 A1 * | 11/2005 |
| WO | WO 2005108106 | 11/2005 |
| WO | WO 2005108108 | 11/2005 |
| WO | WO 2005108110 | 11/2005 |
| WO | WO 2006005434 | 1/2006 |
| WO | WO 2006015733 | 2/2006 |
| WO | WO 2006018171 | 2/2006 |
| WO | WO 2006018172 | 2/2006 |
| WO | WO 2006018172 A1 * | 2/2006 |
| WO | WO 2006040069 | 4/2006 |
| WO | WO 2006056342 | 6/2006 |
| WO | WO 2006072380 | 7/2006 |
| WO | WO 2006087138 | 8/2006 |
| WO | WO 2006099971 | 9/2006 |
| WO | WO 2006119896 | 11/2006 |
| WO | WO 2006128607 | 12/2006 |
| WO | WO 2007006445 | 1/2007 |
| WO | WO 2007006455 | 1/2007 |
| WO | WO 2007076952 | 7/2007 |
| WO | WO 2007079851 | 7/2007 |
| WO | WO 2007115648 | 10/2007 |
| WO | WO 2007/138293 A2 | 12/2007 |
| WO | WO 2008/000350 | 1/2008 |
| WO | WO 2008/000351 | 1/2008 |
| WO | WO 2008/049533 | 5/2008 |
| WO | WO 2008/061636 | 5/2008 |
| WO | WO 2008/071325 | 6/2008 |
| WO | WO 2009/000527 | 12/2008 |
| WO | WO 2009/000528 | 12/2008 |
| WO | WO 2009/000529 | 12/2008 |
| WO | WO 2009/000530 | 12/2008 |

OTHER PUBLICATIONS

International Preliminary Report on Patentability, International Application No. PCT/ EP2008/005624, 10 pages, Jul. 1, 2010, English Translation.

* cited by examiner

SECURITY ELEMENT

CROSS-REFERENCE TO RELATED APPLICATIONS

This application is the U.S. National Stage of International Application No. PCT/EP 2008/005624, filed Jul. 10, 2008, which claims the benefit of German Patent Application DE 10 2007 0340716.4, filed Jul. 23, 2007; both of which are hereby incorporated by reference to the extent not inconsistent with the disclosure herewith.

The present invention relates to a multilayer security element, a security paper and a value document having such a security element. The present invention also relates to a method for manufacturing such security elements and for manufacturing security paper.

From publication WO 95/10420 is known a value document in which, after its manufacture, a through opening is punched that is subsequently closed on one side with a cover foil that overlaps the opening all around. Since the cover foil is transparent at least in sub-regions, the background shows through when the value document is copied and thus makes the copy recognizable as such. The cover foil can also exhibit a security feature, such as a hologram.

A general problem in the manufacture of security elements consists in the fact that standard holograms having an aluminum reflection layer are increasingly more freely available. The security standard of such standard holograms and of the value documents furnished therewith is thus increasingly being reduced.

Based on that, it is the object of the present invention to specify a security element that exhibits an increased counterfeit security compared with the background art.

This object is solved by the multilayer security element having the features of the main claim. A security paper for the manufacture of security documents and a value document having such a security element, as well as a manufacturing method for such a security element and such a value document, are the subject of the coordinated claims. Developments of the present invention are the subject of the dependent claims.

The security element according to the present invention comprises a first, transparent layer structure having first, translucent sub-regions and a second, opaque layer structure exhibiting a color-shift effect and having second, transparent sub-regions. The first and the second layer structure are stacked on top of one another such that the first, translucent sub-regions of the first layer structure and the second, transparent sub-regions of the second layer structure partially overlap.

Within the meaning of the present invention, "translucent" or "translucency" is understood to be a transmittance of less than 90%, preferably between 80% and 20%.

"Transparent" or "transparency" is understood within the meaning of the present invention to be a transmittance of 90% and more, preferably of 95% and more.

"Opaque" or "opacity" is to be understood within the meaning of the present invention to be a transmittance of less than 10%, preferably of 0%.

"Light" is understood to be light from the visible region of the wavelength spectrum (VIS).

In the first layer structure, in an advantageous embodiment of the security element according to the present invention, the first sub-regions are provided with a translucent metallization. The translucent metallization can be a screened metal layer or a thin, contiguous metal layer. If the metal layer is executed to be contiguous, its thickness is preferably between 4 and 20 nm.

Advantageously, the first sub-regions additionally exhibit diffraction patterns. For this, a suitable pattern can be embossed in a substrate or a substrate coated with an embossing lacquer layer. Refraction patterns, transmission, volume or reflection holograms, or also grating patterns may be used as diffraction patterns.

Embodiments in which the translucent metallization and the diffraction patterns are congruent are particularly preferred. This is the case, for example, when a diffraction pattern is evaporated with the translucent metal layer.

The second, opaque layer structure exhibits a color-shift effect and second, transparent sub-regions.

Here, "color-shift effect" is understood to be a viewing-angle-dependent color change.

In advantageous embodiments, the color-shift effect is produced by means of a multilayer thin-film structure or by means of liquid crystal materials.

The color-shift effect of a multilayer thin-film structure is based on interference effects due to multiple reflections in the different sub-layers of the thin-film element and is explained in detail in, for example, publication EP 0 395 410 B1. The color impression of the thin-film element changes with the viewing angle, for example from green to blue, from blue to magenta or from magenta to green.

The thin-film structure of the second layer structure advantageously includes an opaque reflector layer and further layers. The further layers are a dielectric layer and an absorber layer. The dielectric layer preferably lies between the reflector layer and the absorber layer.

The absorber layer is typically formed by thin metal layers having a thickness of 4 nm to 20 nm. Especially chrome, iron, gold, aluminum or titanium, but also rarer metals, such as vanadium, palladium or molybdenum, may be used as metals. Furthermore, for example, also nickel, cobalt, tungsten, niobium or compounds and alloys of the cited metals, such as nickel-chrome-iron, can be used. Further suitable materials for the absorber layers are specified in publication WO 01/03945, the disclosure of which is incorporated herein by reference.

Especially vapor-depositable and transparent materials may be used for the dielectric layer. Suitable materials with a refractive index of less than 1.7 are, for example, silicon dioxide, aluminum oxide, magnesium fluoride and $SiO_x$, where $1<x<2$. Also materials having a higher diffraction index, such as zirconium oxide, zinc sulfide, titanium dioxide or indium tin oxide, can be used. Also for the dielectric layers, further suitable materials are set forth in publication WO 01/03945, and its disclosure is incorporated herein by reference. The dielectric layers typically exhibit a layer thickness of about 100 nm to about 1000 nm, preferably of about 200 nm to about 500 nm.

The reflector layer is preferably formed by a metal layer. In a preferred embodiment of the security element, the reflector layer is formed from a metal of the group aluminum, silver, nickel, copper, gold, iron or chrome. The different colors of the metals used then permit appealing optical contrasts when the security element is viewed. The reflector layer consists particularly preferably of aluminum. The metal layer thickness is chosen such that the layer is opaque.

The absorber layer, the dielectric layer and the reflector layer are preferably applied to a substrate in a vacuum evaporation process. The substrate can later form a component of the finished security element. The layers can also be produced on a substrate that merely serves as an intermediate support.

The intermediate support is removed upon finishing the security element or, at the latest, upon application of the security element to an object. If the substrate serves as an intermediate support, the layers to be applied are applied to the substrate in the reverse order of how they are to appear in the end product. In this case, the security element, with the substrate, is referred to as a transfer element. As evaporation methods, PVD methods, such as boat evaporation, evaporation by resistance or induction heating, AC and DC sputtering, electron beam and arc evaporation, but also CVD methods, such as sputtering in a reactive plasma or other plasma-based evaporation methods, may be used, for example.

The substrate or the intermediate support is preferably a transparent foil, particularly preferably a PET foil.

Alternatively, the color-shift effect can be produced by means of suitable liquid crystal materials. Corresponding security elements are described in EP 0 435 029 B2. For this, according to the present invention, the opaque second layer structure exhibits a—preferably contiguous—layer composed of liquid crystal material and a dark—preferably black—layer.

According to the present invention, the second layer structure exhibits transparent second sub-regions. These are preferably gaps. If thin-film structures are used, these are gaps in the reflector layer, preferably in the reflector and absorber layer. If liquid crystal material is used, they are gaps in the dark layer.

The gaps can be present in arbitrary form, preferably in the form of patterns, characters or codes. The gaps can be developed, for example, in the form of alphanumeric characters or numerals in positive or negative lettering, but also in the form of arbitrary image depictions. Such an identifier further increases the counterfeit security of the security element, which presents itself appealingly to the viewer and also with optical effects that are easily perceptible for the layperson.

The gaps can be produced subsequently by etching, by means of laser ablation or by means of washing processes, as described in EP 1 023 499 B1. Alternatively, masks can be used when vapor depositing the layers into which gaps are introduced. The dark layer is preferably imprinted, with the gaps being able to already be taken into account in the printing process.

The first and second layer structure can be present on a substrate having a first and second substrate surface opposing each other. Here, the first and second layer structure can be present on the same substrate surface of the substrate or, alternatively, on the opposing substrate surfaces.

Moreover, the layer structures are arranged such that the color-shift effect of the second layer structure is perceptible when the security element is viewed from the side of the first layer structure.

The security element is thus considerably more difficult to imitate compared with known security elements. Furthermore, the proposed design constitutes an optically appealing identifying feature that can also be easily perceived and judged as authentic by a layperson.

The substrate is preferably a transparent foil. Polyethylene terephthalate (PET), in particular, is suitable.

The security element according to the present invention can especially be reasonably used anywhere where it can be viewed from opposing sides. For example, it can be arranged in or over an opening of a security paper or a value document, or in or over a transparent region of such documents. Openings and transparent regions together are referred to below as window regions of a document.

It is likewise possible for the security element to be used as a security strip or as a security thread, for example as a window security thread. The layer structure of such security threads is expediently protected with a laminating foil.

In another expedient embodiment, the security element forms a transfer element for application to a security paper, value document and the like. In such a transfer element, the layers to be transferred are expediently applied to the substrate over a separation layer and in the reverse order of how they are appear to in the end product. The substrate serves as an intermediate support and is removed after the transfer of the element to the object to be protected. As transfer elements, band-shaped endless elements or individual elements, so-called "patches", can be used.

The present invention also includes a security paper for manufacturing value documents, such as banknotes, identification cards or the like, having an above-described security element. The security paper can include at least one through window region that is covered with the security element such that the security element is perceptible in the window region when viewed from opposing sides.

The present invention further includes a value document, such as a banknote, an identification card or the like, that is provided with an above-described security element. The value document can include at least one through window region that is covered with the security element such that the security element is perceptible in the window region when viewed from opposing sides.

The security element according to the present invention or a security paper or value document provided therewith can be used, for example, for securing goods of any kind.

A method for manufacturing a security element according to the present invention, for security papers, value documents and the like, comprises the method steps:

a first, transparent layer structure having first, translucent sub-regions and
  a second, opaque layer structure exhibiting a color-shift effect and having second, transparent sub-regions are provided,
  the first layer structure and the second layer structure are stacked on top of one another such that the first, translucent sub-regions of the first layer structure and the second, transparent sub-regions of the second layer structure partially overlap.

In an embodiment according to the present invention, the first and second layer structure are applied to opposing substrate surfaces. A substrate having a first and a second substrate surface opposing each other is preferably provided. Diffraction patterns are embossed in the substrate, in the first sub-regions on the first surface, or the substrate is provided on the first surface with a transparent embossing lacquer layer in which diffraction patterns are embossed in the first sub-regions. The embossed sub-regions are provided with a translucent metal layer. The second layer structure is applied to the second surface.

As the second layer structure, a layer composed of liquid material is applied—preferably contiguously—to the second surface of the substrate, and thereafter, this layer, except for the second sub-regions, is provided with a dark, preferably black layer. The dark layer is preferably imprinted only in some regions such that the second sub-regions are not printed on.

Alternatively, as the second layer structure, the following layers can be vapor deposited on the second surface of the substrate in the sequence absorber layer, dielectric layer, reflector layer.

In a further method according to the present invention, the first and second layer structure are applied to the same substrate surface. For this, a substrate having a first and a second substrate surface opposing each other is provided, the second layer structure applied on the first surface, a transparent embossing lacquer layer in which diffraction patterns are embossed in the first sub-regions applied on the second layer structure, and the embossed sub-regions provided with a translucent metal layer.

A dark layer can be applied—preferably contiguously—to the first surface of the substrate, except for the second sub-regions, and over that, a layer composed of liquid material. Alternatively, the following layers can be vapor deposited on the first surface of the substrate in the sequence reflector layer, dielectric layer, absorber layer.

In a further alternative according to the present invention, a substrate having a first and a second substrate surface opposing each other is provided. In the first substrate surface, either diffraction patterns are embossed directly in the first sub-regions or the substrate is provided on the first surface with a transparent embossing lacquer layer in which diffraction patterns are embossed in the first sub-regions. The embossed sub-regions are preferably provided with a translucent metal layer, and the second layer structure applied thereto.

As the second layer structure, first, a layer composed of liquid crystal material is applied and, to this layer, except for the second sub-regions, a dark—preferably black—layer. Alternatively, as the second layer structure, the following layers can be vapor deposited on the first surface of the substrate in the sequence absorber layer, dielectric layer, reflector layer.

To produce the transparent second sub-regions, the reflector layer can, in the method steps of the inventive embodiments in which the reflector layer is applied, not be applied in these second sub-regions or be subsequently removed. In particular, the reflector layer can be removed by means of etching, laser or washing processes.

In a further variant, a first and a second substrate can each be provided with a first and a second substrate surface opposing each other. The first layer structure is applied to the first side of the first substrate and the second layer structure to the first side of the second substrate and the first and second substrate are laminated together with the respective second surface.

To produce a security thread or a transfer element, the security element can be cut or punched and equipped accordingly in further processing steps.

To manufacture a security paper, the security element according to the present invention is introduced into a paper having a window region or is applied to the paper, the window region being spanned by the security element.

Further exemplary embodiments and advantages of the present invention are explained below by reference to the drawings, in which a depiction to scale and proportion was omitted in order to improve their clarity.

Shown are.

Figure 1:
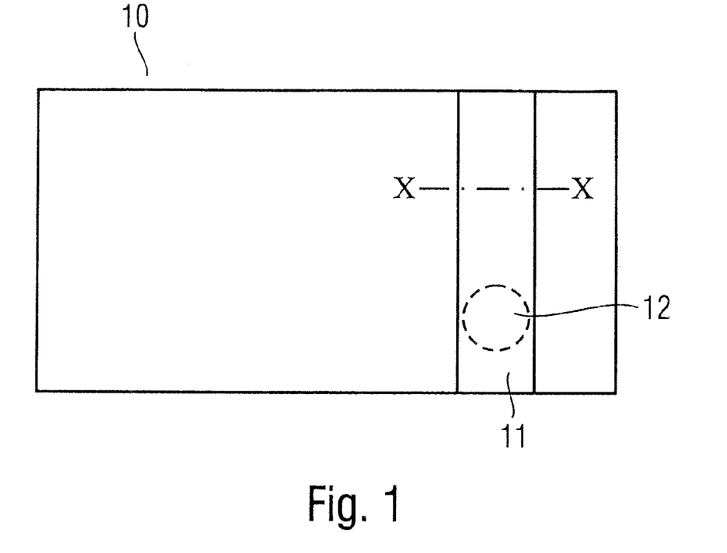
FIG. 1 a schematic diagram of a banknote having a security element according to the present invention, FIG. 2 a cross section through a security element according to an exemplary embodiment of the present invention, FIGS. 3a, 3b and 4a, 4b in each case, a cross section through a security element according to an exemplary embodiment of the present invention, and FIG. 5 a top view of a security element.

The invention will be explained below using a banknote as an example. For this, FIG. 1 shows a schematic diagram of a banknote 10 that exhibits an inventive security element 11 in the form of an approximately 10 mm wide band that covers a circular window region 12 that is present in the banknote. The window region 12 is a hole in the paper that, for example, was incorporated during paper manufacture according to EP 1 468 141 A2 or was punched out after paper manufacture. The security element is affixed to the paper after paper manufacture.

Figure 3A:
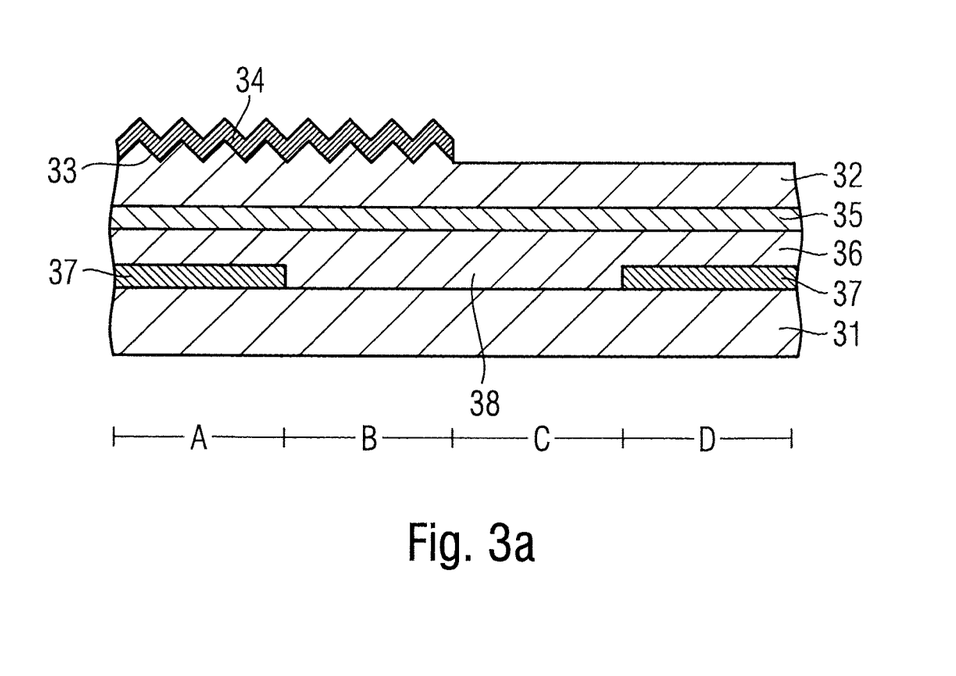
Figure 3B:
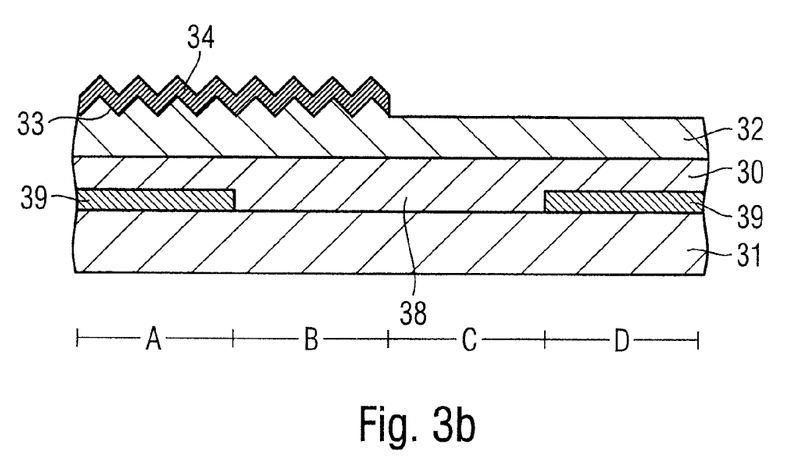
Figure 4A:
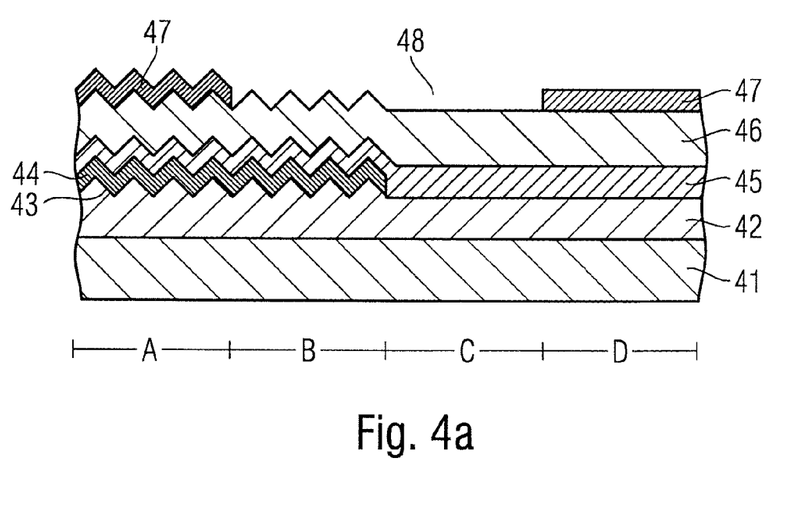
Figure 4B:
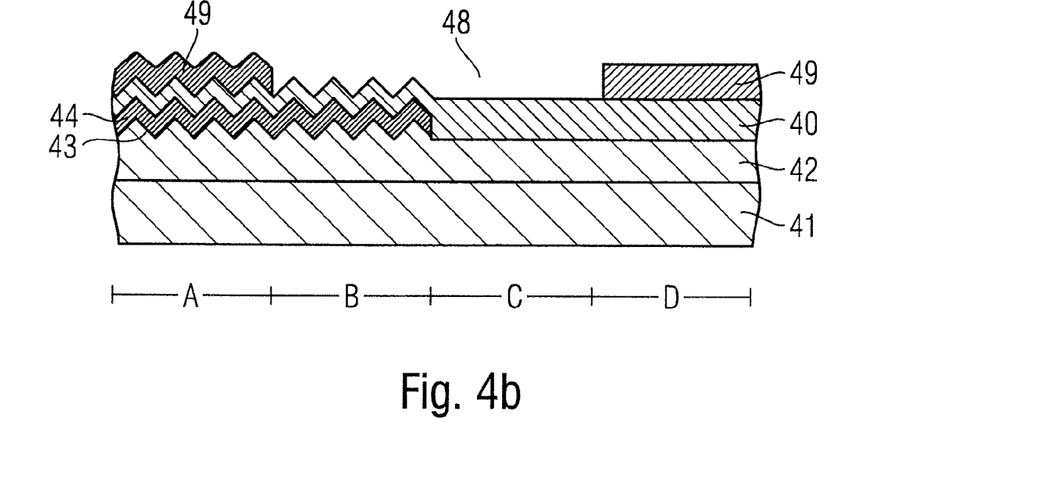
Figure 5:
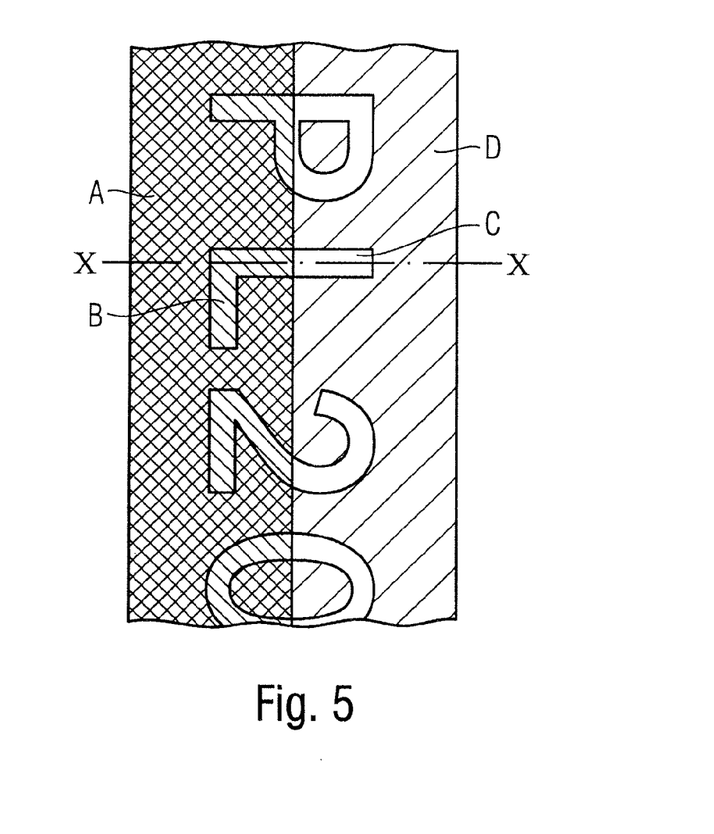

In FIGS. 2a to 4b, different alternative embodiments of the security element according to the present invention are shown in cross section along the line X-X in FIG. 1 and FIG. 5. The regions A, B, C and D indicate sections in the security element having certain optical forms of appearance that are explained in greater detail for FIG. 5.

Figure 2A:
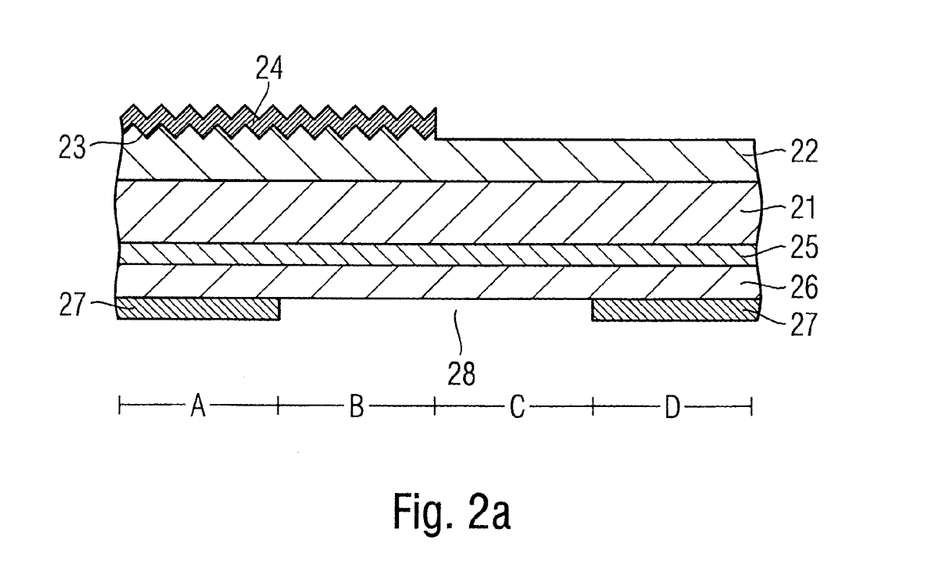

In FIG. 2a is shown in cross section a security element in which the first and second layer structure are located on opposing sides of a substrate 21. The first layer structure is arranged on the first substrate surface, the second layer structure on the second substrate surface. The substrate is a transparent foil, preferably PET, to which a transparent embossing lacquer layer 22 was applied. In the embossing lacquer layer are embossed diffraction patterns 23 that constitute the first sub-regions. Alternatively, the diffraction patterns can be embossed directly in the substrate such that an embossing lacquer layer can be dispensed with. The diffraction patterns are evaporated with a translucent metal layer 24. The second layer structure having a color-shift effect is present on the second substrate surface. The color-shift effect is produced by means of a thin-film structure that consists of an absorber layer 25, a dielectric layer 26 and a reflector layer 27. At manufacture, the absorber layer is first vapor deposited on the substrate. Then the dielectric layer, and thereafter the reflector layer, is vapor deposited on the absorber layer. Gaps 28 are incorporated in the reflector layer in that, by means of etching, lasering or washing processes, the reflector layer is subsequently partially removed again or already vapor deposited only partially by means of masks.

The first and second layer structure can also be prepared separately on the first substrate surface of each of a first and a second substrate. The substrates furnished with the layer structures can then be laminated together with the respective second substrate surfaces (not shown).

Figure 2B:
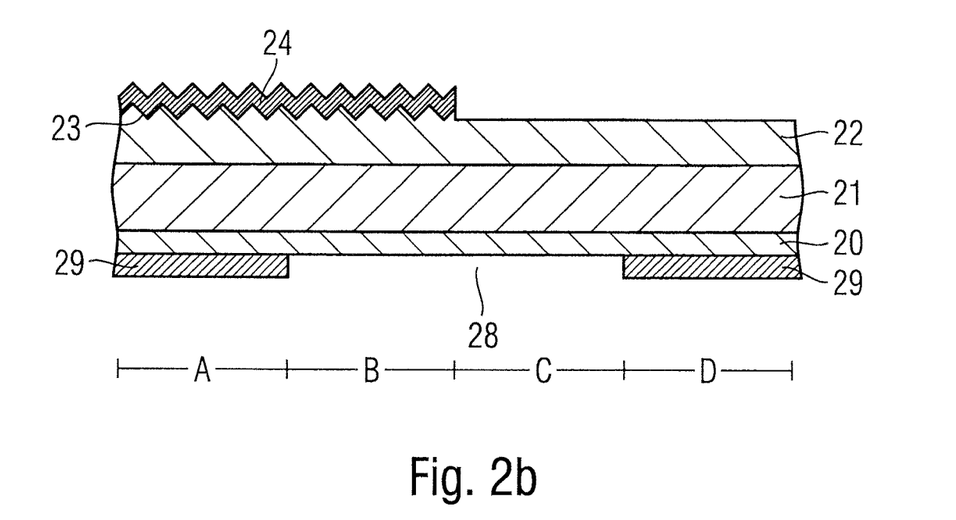

FIG. 2b shows a security element whose structure substantially corresponds to the structure in FIG. 2a. The security element differs from that shown in FIG. 2a in the second layer structure. Here, the color-shift effect is produced, not by means of a multilayer thin-film structure, but rather by means of a layer composed of liquid crystal material 20 and a dark layer 29 having gaps 28. Here, the liquid crystal layer is first imprinted contiguously on the substrate and then printed on with a dark layer. The remaining reference numbers correspond to those in FIG. 2a.

In FIG. 3a is shown in cross section a security element in which the first and second layer structure are located on the same side of a substrate 31. The second layer structure is arranged on the first substrate surface, and the first layer structure is applied on the second layer structure. The substrate is a transparent foil, preferably PET. To this is applied the second layer structure having a color-shift effect. The color-shift effect is produced by means of a thin-film structure that consists of an absorber layer 35, a dielectric layer 36 and a reflector layer 37. At manufacture, the reflector layer is first vapor deposited. Gaps 38 are incorporated in the reflector layer in that, by means of etching, lasering or washing processes, the reflector layer is subsequently partially removed again or already vapor deposited only partially by means of masks. Then the dielectric layer and thereafter the absorber layer are vapor deposited. On this layer structure is imprinted a transparent embossing lacquer layer 32. Diffraction patterns 33 are embossed in the embossing lacquer layer in the first sub-regions. The diffraction patterns are evaporated with a translucent metal layer 34. In this embodiment variant, it is possible, following application of the security element to the object to be secured, to remove the substrate. This has the advantage that the security element exhibits a smaller thickness overall and thus hardly affects the thickness of the end product.

FIG. 3b shows a security element whose structure substantially corresponds to the structure in FIG. 3a. The security element differs from that shown in FIG. 3a in the second layer structure. Here, the color-shift effect is produced, not by means of a multilayer thin-film structure, but rather by means of a layer composed of liquid crystal material 30 and a dark layer 39 having gaps 38. Here, the dark layer is first printed on the second layer structure in some regions and then provided with a contiguous layer composed of liquid crystal material. Here, too, the substrate can be removed after transferring the security element to the object to be secured. The remaining reference numbers correspond to those in FIG. 3a.

In FIG. 4a is shown in cross section a security element in which the first and second layer structure are located on the same side of a substrate 41. The first layer structure is arranged on the first substrate surface and the second layer structure is applied on the first layer structure. The substrate is a transparent foil, preferably PET, to which a transparent embossing lacquer layer 42 was applied. Diffraction patterns 43 are embossed in the embossing lacquer layer in the first sub-regions. Alternatively, the diffraction patterns can be embossed directly in the substrate such that an embossing lacquer layer can be dispensed with. The diffraction patterns are evaporated with a translucent metal layer 44. The second layer structure having a color-shift effect is present on this first layer structure. The color-shift effect is produced by means of a thin-film structure that consists of an absorber layer 45, a dielectric layer 46 and a reflector layer 47. At manufacture, the absorber layer is first vapor deposited on the partially embossed and metallized substrate or the partially embossed and metallized embossing lacquer layer. Then the dielectric layer, and thereafter the reflector layer, is vapor deposited on the absorber layer. Gaps 48 are incorporated in the reflector layer in that, by means of etching, lasering or washing processes, the reflector layer is subsequently partially removed again or already vapor deposited only partially by means of masks. In this embodiment variant, it is possible, following application of the security element to the object to be secured, to remove the substrate. This has the advantage that the security element exhibits a smaller thickness overall and thus has hardly any impact on the thickness of the end product.

FIG. 4b shows a security element whose structure substantially corresponds to the structure in FIG. 4a. The security element differs from that shown in FIG. 4a in the second layer structure. Here, the color-shift effect is produced, not by means of a multilayer thin-film structure, but rather by means of a layer composed of liquid crystal material 40 and a dark layer 49 having gaps 48. Here, the liquid crystal layer is first applied, for example printed, on the first layer structure, and then printed on in some regions with a dark layer. Here, too, the substrate can be removed after transferring the security element to the object to be secured. The remaining reference numbers correspond to those in FIG. 4a.

The embodiments in FIGS. 4a and 4b have the advantage that the second layer structure reproduces the embossing patterns. Irradiated light is optimally utilized by both the layer structure that displays the color-shift effect and the layer structure that displays diffraction effects such that the diffraction effect and the color-shift effect appear particularly brilliantly.

FIG. 5 shows an inventive security element in top view with a view of the first layer structure. Possible layer structures of the security element are shown in FIG. 2a to 4b. The cross sections shown in FIG. 2a to FIG. 4b result, for example, at an intersection along the line X-X in FIG. 5. A diffraction optical image having a color-shift effect is perceptible in region A. In this region, translucent regions of the first layer structure and opaque regions of the second layer structure are stacked on top of one another.

No reflector layer or no dark layer is present in region B in the second layer structure, such that no color-shift effect is visible. In other words, the viewer perceives a translucent, diffraction optical image in region B. Depending on the embodiment of the translucent properties of the diffraction optical image, the diffraction optical image can, due to its almost transparent properties, be hardly perceptible or, if it has more strongly reflective properties, stand out more clearly. Here, the reflection can easily be adjusted via, for example, the layer thickness of the translucent metallization 24, 34, 44.

No reflection layer or dark layer is present also in region C in the second layer structure. Here, the first layer structure is transparent such that the viewer perceives a transparent window.

The gaps in the reflection layer or the dark layer are preferably easily perceptible in transmitted light across their entire expanse, that is, in regions B and C, in other words also in the overlap region with the translucent sub-regions of the first layer structure.

In region D, transparent regions of the first layer structure and opaque regions of the second layer structure are stacked on top of one another and the viewer perceives a pure color-shift effect.

When the security element is viewed from the side of the second layer structure, a dark or reflective layer is visible in regions A and D (FIG. 2a to FIG. 3b). If the layer structures are designed such that the diffraction patterns of the first layer structure are imaged in the second layer structure, especially in the reflector layer, then a diffraction optical image is visible in these regions. The gaps in the reflector layer or the dark layer appear transparent in region C and as translucent regions having a diffraction optical image in region B. The degree of translucency, in turn, determines the degree of visibility of the diffraction optical image. The optically thinner the translucent layer is executed to be, the further the diffraction optical image recedes compared with the transparent regions C.

If the individual sub-regions are arranged skillfully in the layer structures, the most varied information and diverse variations thereof can be depicted in complex form. In the present case, the lettering "PL20" exhibits four optically different-appearing regions A, B, C, D that can be achieved only through exact and complex manufacturing.

The invention claimed is:
1. A multilayer security element comprising
a first, transparent layer structure having first, translucent sub-regions, the first sub-regions exhibiting diffraction patterns and a translucent metallization, the translucent metallization being present on the diffraction patterns, and
a second, opaque layer structure exhibiting a color-shift effect and having second, transparent sub-regions,
wherein the second layer structure is a thin-film structure that comprises an opaque reflector layer and further layers, and wherein the second sub-regions are gaps in the reflector layer, wherein the first layer structure and the second layer structure are stacked on top of one another such that the first, translucent sub-regions of the first layer structure and the second, transparent sub-regions of the second layer structure partially overlap, and wherein the further layers of the thin-film structure lie between the opaque reflector layer and the first layer structure.

2. The security element according to claim 1, characterized in that the metallization is a contiguous or a screened metal layer.

3. The security element according to claim 1, characterized in that the diffraction patterns are introduced into an embossing lacquer layer.

4. The security element according to claim 1, characterized in that the reflector layer consists of aluminum.

5. The security element according to claim 1, characterized in that the further layers comprise a dielectric layer and an absorber layer.

6. The security element according to claim 5, characterized in that the second sub-regions are gaps in the reflector and absorber layer.

7. The security element according to claim 1, characterized in that the gaps are etched, lasered or produced by means of washing processes.

8. The security element according to claim 1, characterized in that the first and second layer structure are present on a substrate having a first and a second substrate surface opposing each other.

9. The security element according to claim 8, characterized in that the first and second layer structure are present on the opposing substrate surfaces of the substrate.

10. The security element according to claim 8, characterized in that the first and second layer structure are present on the same substrate surface of the substrate.

11. The security element according to claim 1, characterized in that the color-shift effect of the second layer structure is perceptible when the security element is viewed from the side of the first layer structure.

12. The security element according to claim 1, characterized in that the security element is a security thread or a transfer element.

13. A multilayer security element comprising a first, transparent layer structure having first, translucent sub-regions, the first sub-regions exhibiting diffraction patterns and a translucent metallization, the translucent metallization being present on the diffraction patterns, and a second, opaque layer structure exhibiting a color-shift effect and having second, transparent sub-regions, wherein the second layer structure comprises a layer composed of liquid crystal material and a dark layer, and wherein the second sub-regions are gaps in the dark layer, wherein the first layer structure and the second layer structure are stacked on top of one another such that the first, translucent sub-regions of the first layer structure and the second, transparent sub-regions of the second layer structure partially overlap, and wherein the layer composed of liquid crystal material lies between the dark layer and the first layer structure.

14. The security element according to claim 13, characterized in that the metallization is a contiguous or a screened metal layer.

15. The security element according to claim 13, characterized in that the diffraction patterns are introduced into an embossing lacquer layer.

16. The security element according to claim 13, characterized in that the second layer structure comprises a contiguous layer composed of liquid crystal material.

17. The security element according to claim 13, characterized in that the dark layer is black.

18. The security element according to claim 13, characterized in that the gaps are etched, lasered or produced by means of washing processes.

19. The security element according to claim 13, characterized in that the first and second layer structure are present on a substrate having a first and a second substrate surface opposing each other.

20. The security element according to claim 19, characterized in that the first and second layer structure are present on the opposing substrate surfaces of the substrate.

21. The security element according to claim 19, characterized in that the first and second layer structure are present on the same substrate surface of the substrate.

22. The security element according to claim 13, characterized in that the color-shift effect of the second layer structure is perceptible when the security element is viewed from the side of the first layer structure.

23. The security element according to claim 13, characterized in that the security element is a security thread or a transfer element.

* * * * *